(12) United States Patent
Gagliano

(10) Patent No.: US 7,712,812 B2
(45) Date of Patent: May 11, 2010

(54) FLATBED EXTENDER SYSTEM FOR A VEHICLE

(76) Inventor: Philip Gagliano, 20 Dorethy Rd., Redding, CT (US) 06896-2912

( * ) Notice: Subject to any disclaimer, the term of this patent is extended or adjusted under 35 U.S.C. 154(b) by 332 days.

(21) Appl. No.: 11/724,450

(22) Filed: Mar. 15, 2007

(65) Prior Publication Data
US 2009/0096237 A1     Apr. 16, 2009

(51) Int. Cl.
*B62D 33/02*     (2006.01)
(52) U.S. Cl. .................... 296/26.09; 414/522
(58) Field of Classification Search .............. 296/26.09, 296/26.13, 170, 171, 175; 414/522
See application file for complete search history.

(56) References Cited

U.S. PATENT DOCUMENTS

| | | | |
|---|---|---|---|
| 1,756,629 A | 4/1930 | Campbell | |
| 2,643,395 A | 6/1953 | Stassinos | |
| 2,784,027 A | 3/1957 | Temp | |
| 2,788,137 A | 4/1957 | Harkness | |
| 2,892,556 A | 6/1959 | Lowe | |
| 3,006,487 A | 10/1961 | Gelli | |
| 3,132,755 A | 5/1964 | Greenslate | |
| 3,726,422 A | 4/1973 | Zelin | 214/83.24 |
| 3,797,880 A * | 3/1974 | Pezzaglia | 296/26.13 |
| 4,305,695 A | 12/1981 | Zachrich | 414/522 |
| 4,681,360 A | 7/1987 | Peters et al. | 296/37.6 |
| 4,824,158 A | 4/1989 | Peters et al. | 296/37.6 |
| 5,052,878 A * | 10/1991 | Brockhaus | 414/522 |
| 5,064,335 A | 11/1991 | Bergeron et al. | 414/522 |
| 5,098,146 A | 3/1992 | Albrecht et al. | 296/26 |
| 5,431,523 A * | 7/1995 | Ferguson | 414/525.9 |
| 5,454,684 A | 10/1995 | Berens | 414/522 |
| 5,501,500 A | 3/1996 | Cannon | 296/26 |
| 5,513,941 A | 5/1996 | Kulas et al. | 414/522 |
| 5,533,771 A | 7/1996 | Taylor et al. | 296/26 |
| 5,634,408 A | 6/1997 | Jarkowski | 108/44 |
| 5,649,731 A | 7/1997 | Tognetti | 296/26 |
| 5,820,190 A | 10/1998 | Benner | 296/26.09 |
| 5,934,725 A | 8/1999 | Bowers | 296/26.09 |
| 5,938,262 A | 8/1999 | Mills | 296/26.09 |
| 5,944,371 A | 8/1999 | Steiner et al. | 296/26.09 |
| 6,059,339 A | 5/2000 | Madson | 296/26.01 |
| 6,065,792 A * | 5/2000 | Sciullo et al. | 296/26.09 |
| 6,120,075 A | 9/2000 | Terry | 296/26.09 |
| 6,312,034 B1 | 11/2001 | Coleman, II et al. | 296/26.1 |
| 6,464,274 B2 | 10/2002 | Mink et al. | 296/26.09 |
| 7,416,234 B2 * | 8/2008 | Bequette | 296/26.09 |
| 2002/0105201 A1* | 8/2002 | Melotik et al. | 296/26.09 |
| 2002/0109368 A1 | 8/2002 | Mink et al. | 296/26.13 |
| 2002/0180231 A1* | 12/2002 | Fox | 296/26.01 |
| 2003/0146636 A1 | 8/2003 | Keller | 296/26.09 |
| 2006/0125267 A1* | 6/2006 | Stevenson et al. | 296/26.09 |

FOREIGN PATENT DOCUMENTS

GB     2105296     6/1982

\* cited by examiner

*Primary Examiner*—Dennis H Pedder
(74) *Attorney, Agent, or Firm*—Ohlandt, Greeley, Ruggiero & Perle, L.L.P.

(57) ABSTRACT

An extender bed system having channel affixed to the flatbed of the vehicle and a cradle slidingly received within the channel. An extendable bed is slidingly received within the cradle and a plurality of bearings affixed to the cradle permit sliding movement of the cradle in the channel and sliding movement of the extendable bed in the cradle.

21 Claims, 9 Drawing Sheets

FLATBED EXTENDER SYSTEM FOR A VEHICLE

BACKGROUND OF THE INVENTION

1. Field of the Invention

The present invention relates to an flatbed extender system for a vehicle having a flatbed. More particularly, the present invention relates to a flatbed extender system for a flatbed vehicle, in which the extender system has an extender bed that is capable of fully extending away from the flatbed of the vehicle.

2. Description of Related Art

Flatbed vehicles are designed to carry heavy or long loads that one would not or could not transport in a traditional passenger vehicle. Individuals who have occasion to carry such loads can use pick-up trucks, station wagons or, more recently, sports utility vehicles. For extremely large loads, such as, the contents of a household, trucks or vans having extremely large flatbeds are often used. However, one of the difficulties with such vehicles whether they be pick-up trucks or commercial vans, is retrieving the contents from the vehicle in a safe yet efficient manner. Invariably, the user of the vehicle must bend or even climb into the vehicle to access the contents. In the case of commercial moving vans, the user must physically walk into the van to obtain the entire contents and possibly unload unwanted contents to obtain access to the desired contents.

Accordingly, there is a need for a simple, efficient and cost effective extender system that can be fitted to an existing vehicle flatbed and that permits a cargo receiving platform to extend away from the vehicle.

SUMMARY OF THE INVENTION

The present disclosure provides for a flatbed extender system having an extender bed that is capable of fully extending away from the flatbed of a vehicle.

The present disclosure also provides for a flatbed extender system that has a channel affixed a vehicle flatbed, where the channel receives a cradle and the cradle slidingly receives an extender bed.

The present disclosure further provides for a flatbed extender system that can be sized to accommodate a wide range of vehicles from pick-up truck sized vehicles to full sized moving vehicles.

The present disclosure still further provides for a flatbed extender system that can be manually operated during its extension as the extender bed moves away from the flatbed of the vehicle.

The present disclosure still yet further provides for a flatbed extender system has an extender bed that is capable of stopping intermittently during its extension away from the flatbed of the vehicle.

The present disclosure yet still further provides for a flatbed extender system that is capable of automatically stopping during its extension from the flatbed of the vehicle.

The present disclosure provides for a flat bed extender system that has a safety feature to prevent accidental disengagement of the extender bed from the extender system.

The present disclosure further provides for a flatbed extender system having an extender bed having a pair of adjustable support legs to accommodate for different weight loads and for different surface heights.

The present disclosure still further provides for a flatbed extender system that can be fitting to existing vehicles having flatbeds.

The present disclosure provides for an extender bed system having channel affixed to the flatbed of the vehicle and a cradle slidingly received within the channel. An extender bed is slidingly received within the cradle and a plurality of bearings affixed to the cradle permit sliding movement of the cradle in the channel and sliding movement of the extender bed in the cradle.

DETAILED DESCRIPTION OF THE INVENTION

Figure 1:
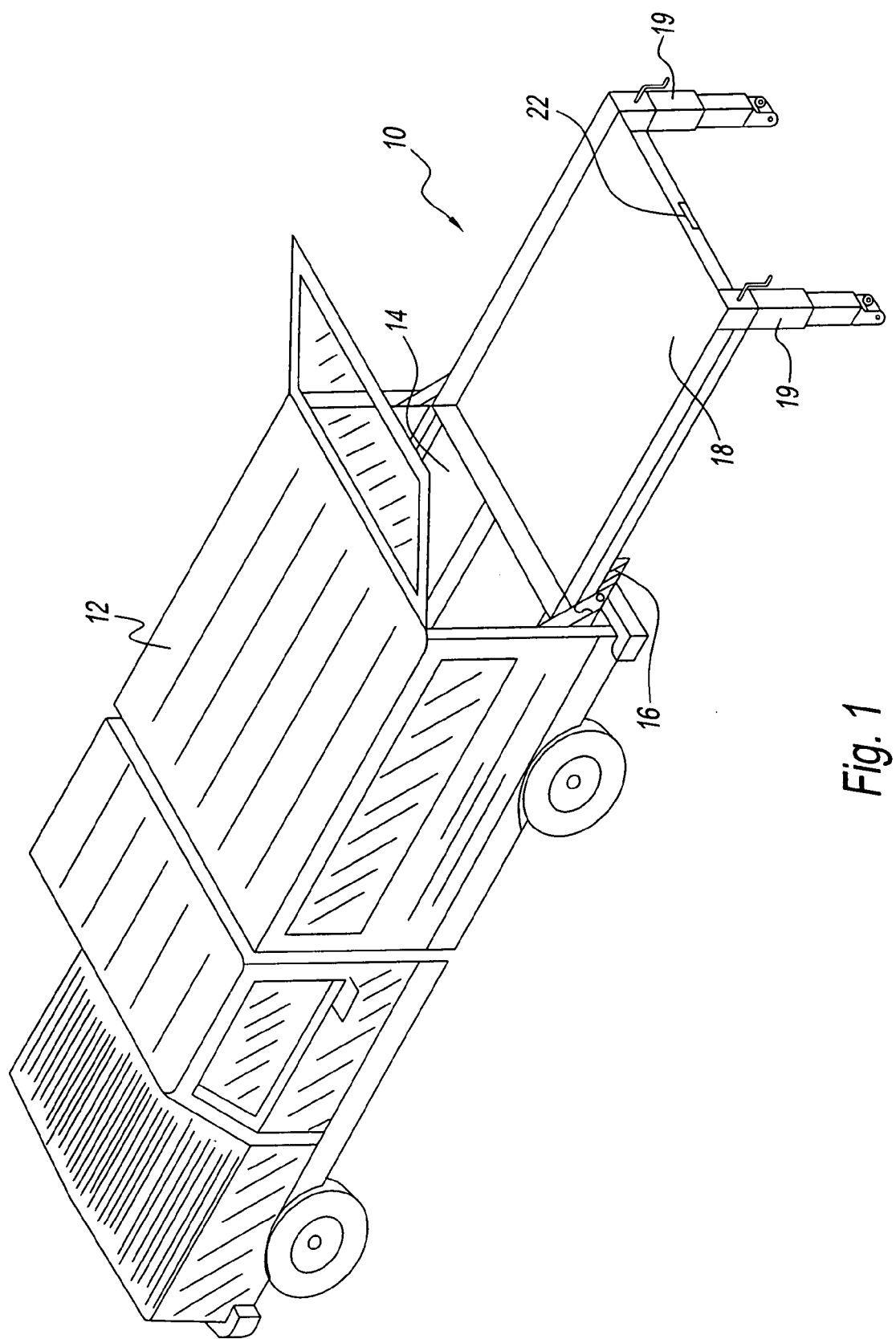
FIG. 1 illustrates a perspective view of the flatbed extender bed system of the present invention showing the extender bed in a position extended away from the vehicle.
Figure 2:
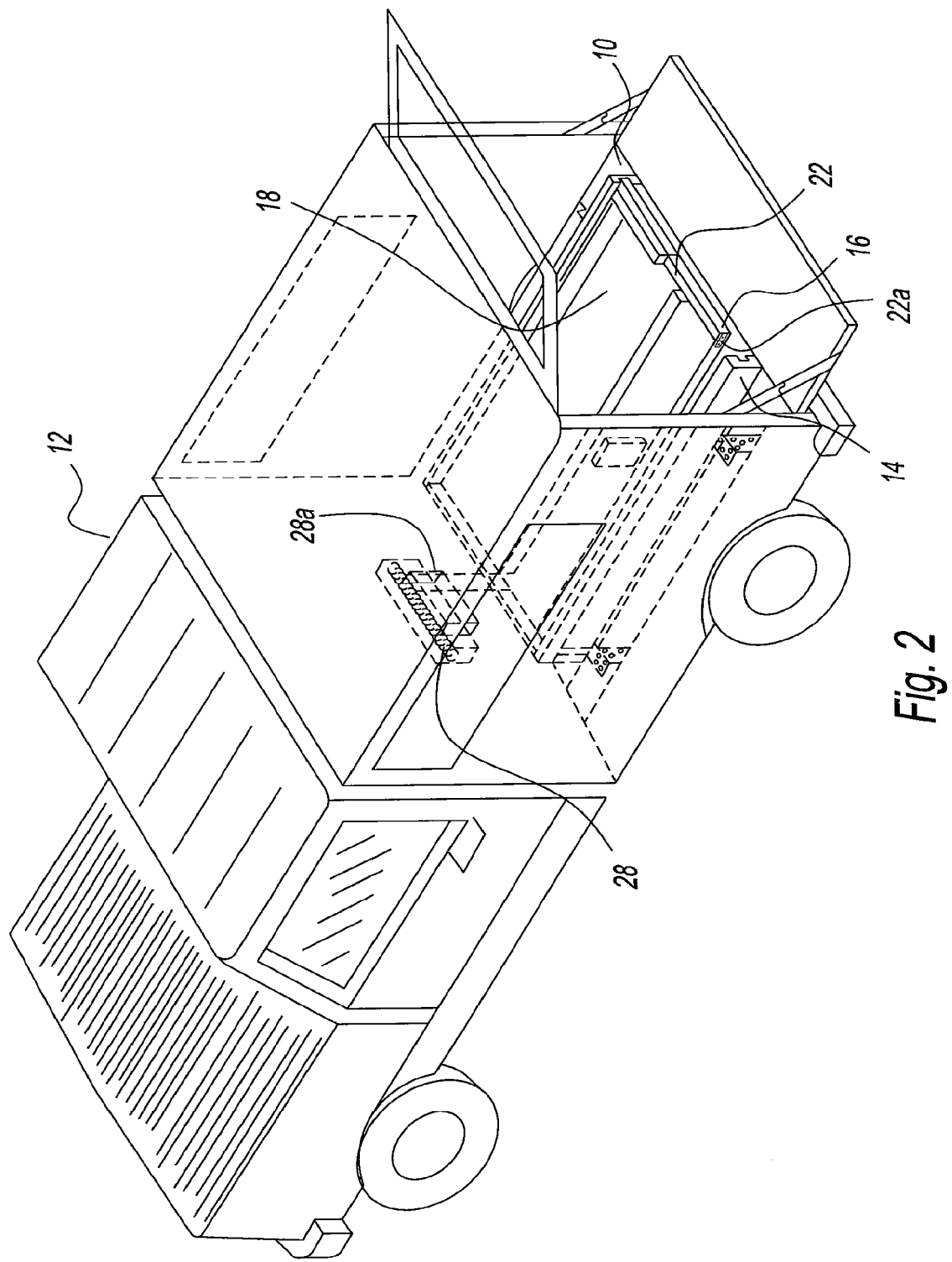
FIG. 2 illustrates a perspective view of the flatbed extender system of FIG. 1 showing the extender bed in a position fully retracted into the vehicle.

Referring to the drawings and particularly to FIG. 1, there is illustrated an extender bed system 10 according to the present invention generally represented by reference numeral. Extender bed system 10 has a channel 14 and a cradle 16 that is slidingly received in channel 14. Cradle 16 sliding receives an extender bed 18 that is free to move in and out of the cradle 16 during use. A pair of legs 19 are extendable from a forward edge 22 of extender bed 18 via hinge 22*a* to provide support to bed when it is extended from vehicle 12, as shown. Legs 19 are preferably hinged to bed 18 to facilitate folding behind bed. Extender bed system 10 is shown as being connected to a passenger pick-up vehicle 12. However, the present invention can be used in conjunction with a vehicle of any size that has a flatbed ranging from the size of a hatch-back vehicle to a commercial sized moving vehicle or van for national moves. Flatbed extender system 10 is shown in FIG. 2, in the retracted position in which bed 18 is entirely inside of vehicle 12.

However, the present invention can be used in conjunction with a vehicle of any size that has a flatbed ranging from the size of a hatch-back vehicle to a commercial sized moving vehicle or van for national moves. Flatbed extender system 10 is shown in FIG. 2, in the retracted position in which bed 18 is entirely inside of vehicle 12.

Figure 3:
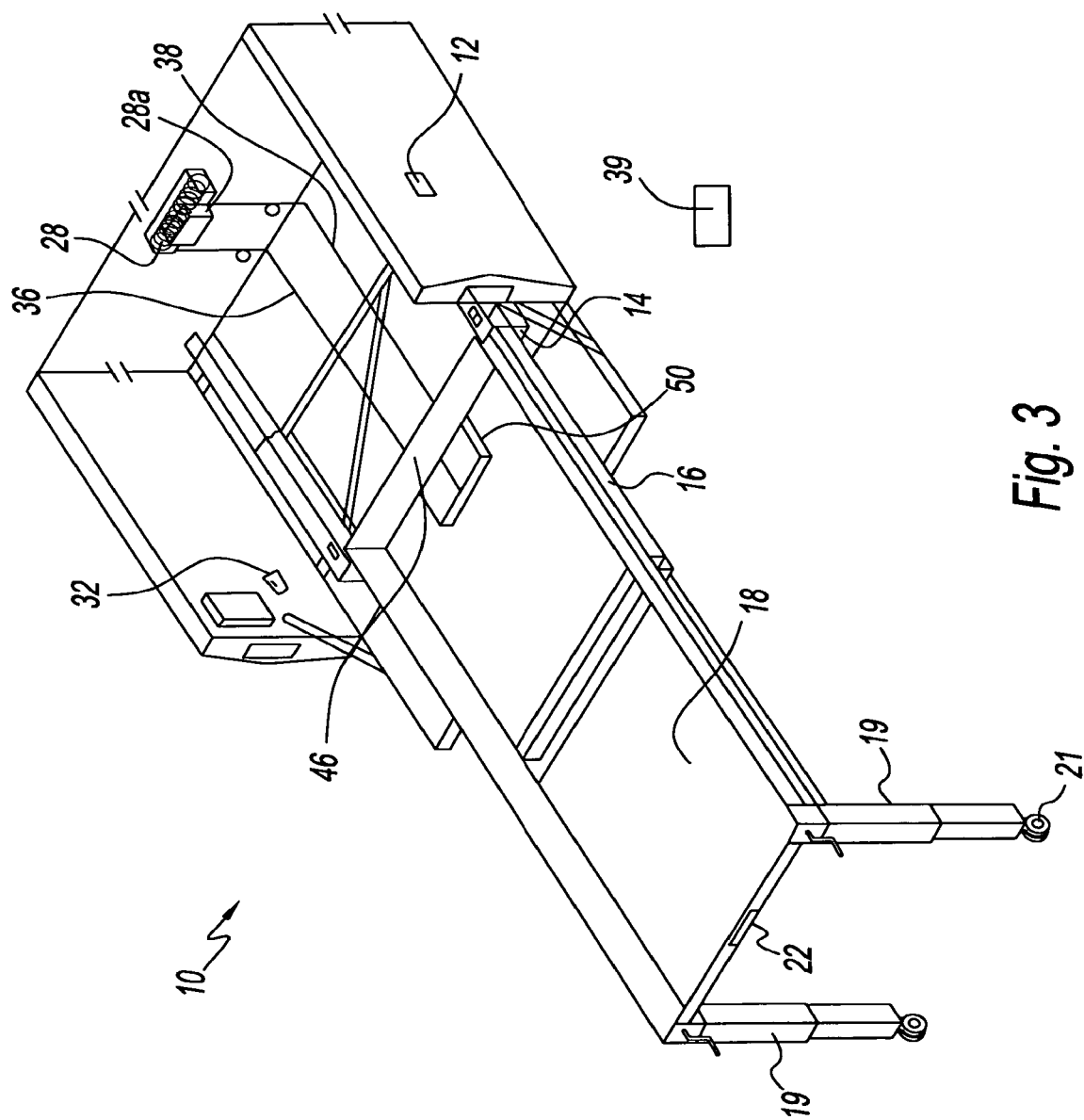
FIG. 3 illustrates an perspective view of the flatbed extender system of FIG. 1 in the fully extended position.
Figure 4:
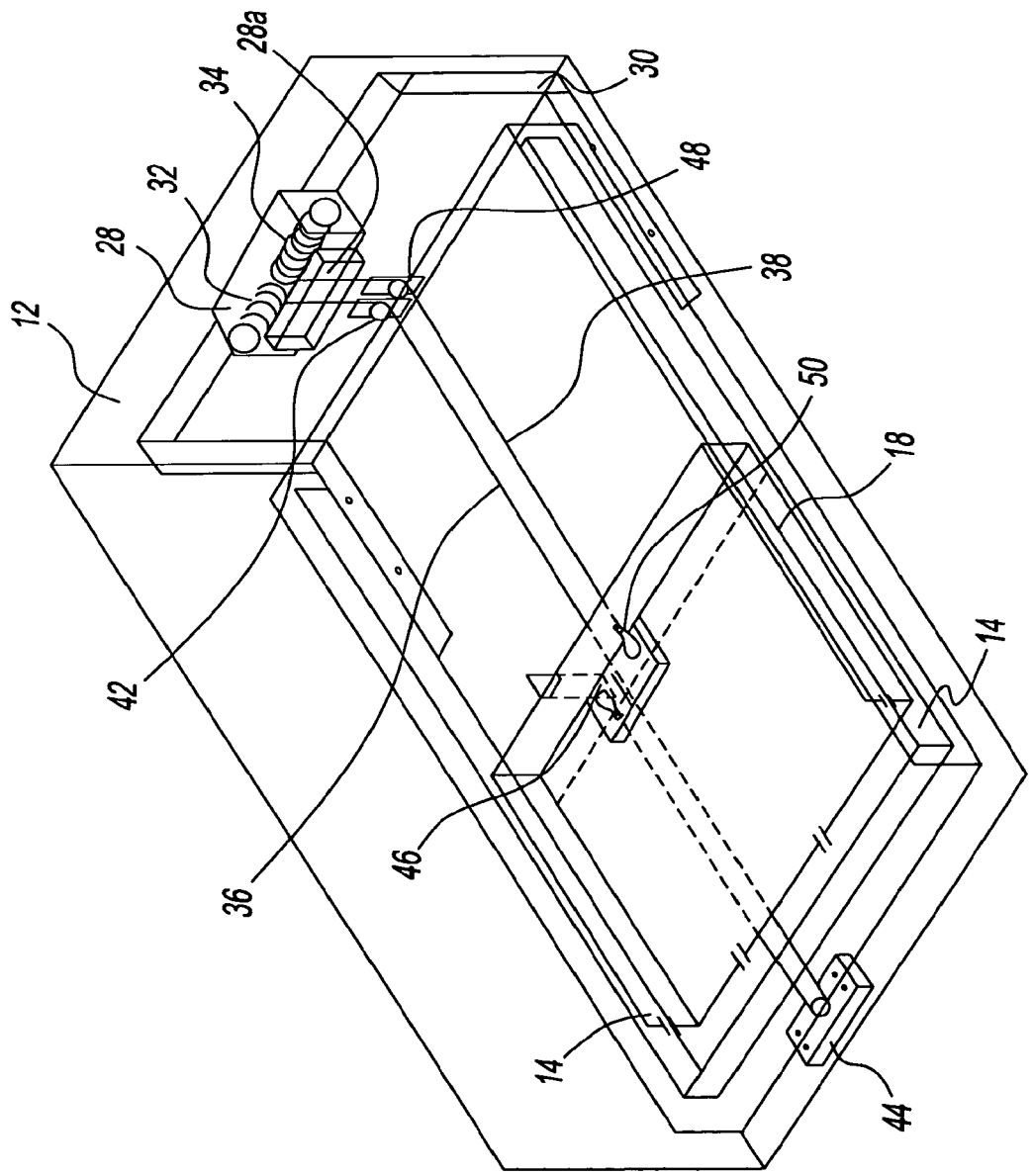
FIG. 4 illustrates a front perspective view of the winch of the flatbed extender system of FIG. 1.

Referring to FIGS. 3 and 4, a winch 28 controls movement of extender bed 18 in cradle 16. Winch 28 has a frame 30 that is bolted or securely affixed to vehicle 12. Frame 30 ensures that winch 28 is securely fixed to vehicle 12 to prevent cargo on extender bed 18 from dislodging or disengaging winch 28. Winch 28 has two sides 32 and 34 that are each preferably, separately motorized for forward and reverse motion. Alternatively, a single reversible motor 28a can be used for forward and reversible motion. Side controls 32 advancement of cable 36 to push flatbed 18 away from vehicle 12. Side 34 of winch 28 retracts cable 38 and pulls extender bed 18 back onto vehicle 12.

Cables 36 and 38 and pull extender bed 18, respectively, away and on vehicle 12, respectively. Cables 36 and 38 limit the distance that extender bed 18 extends along and out of cradle 16. Cable 36 runs though pulleys 42 and 44 on base of vehicle 12. Cable 36 is connected to underside of extender bed 18 at connector 46. Cable 38 runs through pulley 48 at base of vehicle 12 and connects to connector 50 on underside of extender bed 18. Connectors 46 and 50 are securely attached and preferably welded to backside and/or rear of extender bed 18.

Winch 28 can alternatively be manually operable on, for example, a small pick-up truck, a hatch-back or a sports utility vehicle. However, winch 28 is preferably motorized to smoothly operate cables 36 and 38. Winch 28 is activated by a switch on vehicle 12 to permit the extension and the retraction of extender bed 18 in an efficient and controlled manner when the load is heavy. Alternatively, winch 28 has a at least one motor that is remotely controlled by a remote control to allow the movement (starting and stopping) of extender bed 18 at various locations during its extension along cradle 16. For example, on a large vehicle, extender bed 18 can be stopped at various points along cradle to unload cargo that is on a mid-point of extender bed 18. Otherwise, time-consuming unloading and reloading would be required for centrally placed loads.

Legs 19 at forward edge of extender bed 18 are preferably telescopically configured to have an adjustable length. Legs 19 each preferably have a spring that is axially positioned to accommodate vehicle beds of different heights and uneven surfaces. Legs also have a mechanism to keep them in an opened position during use. Legs 19 also preferably have wheels 21 connected at the lower ends to accommodate uneven surfaces as well. Legs 19 can be adjusted or shortened and/or folded behind extender bed 18, when system 10 is stored or not in use. Legs can be adjusted, for example, by using a gears, cranks 11 or hydraulic mechanism. The system 10 entirely stores back into flatbed of vehicle 12, as shown in FIG. 2.

Figure 5:
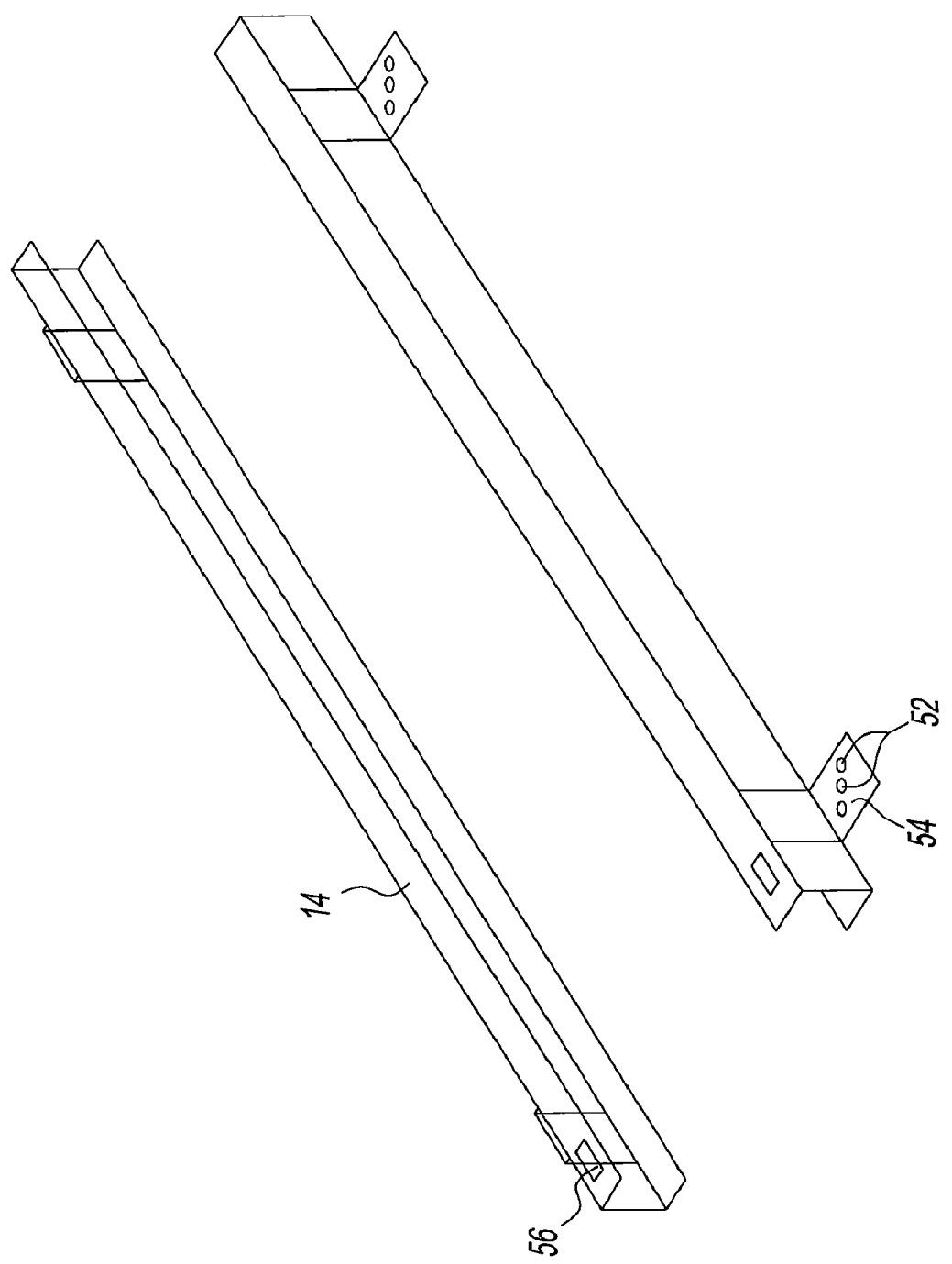
FIG. 5 illustrates a perspective view of the channel of the flatbed extended bed system of FIG. 3.
Figure 6:
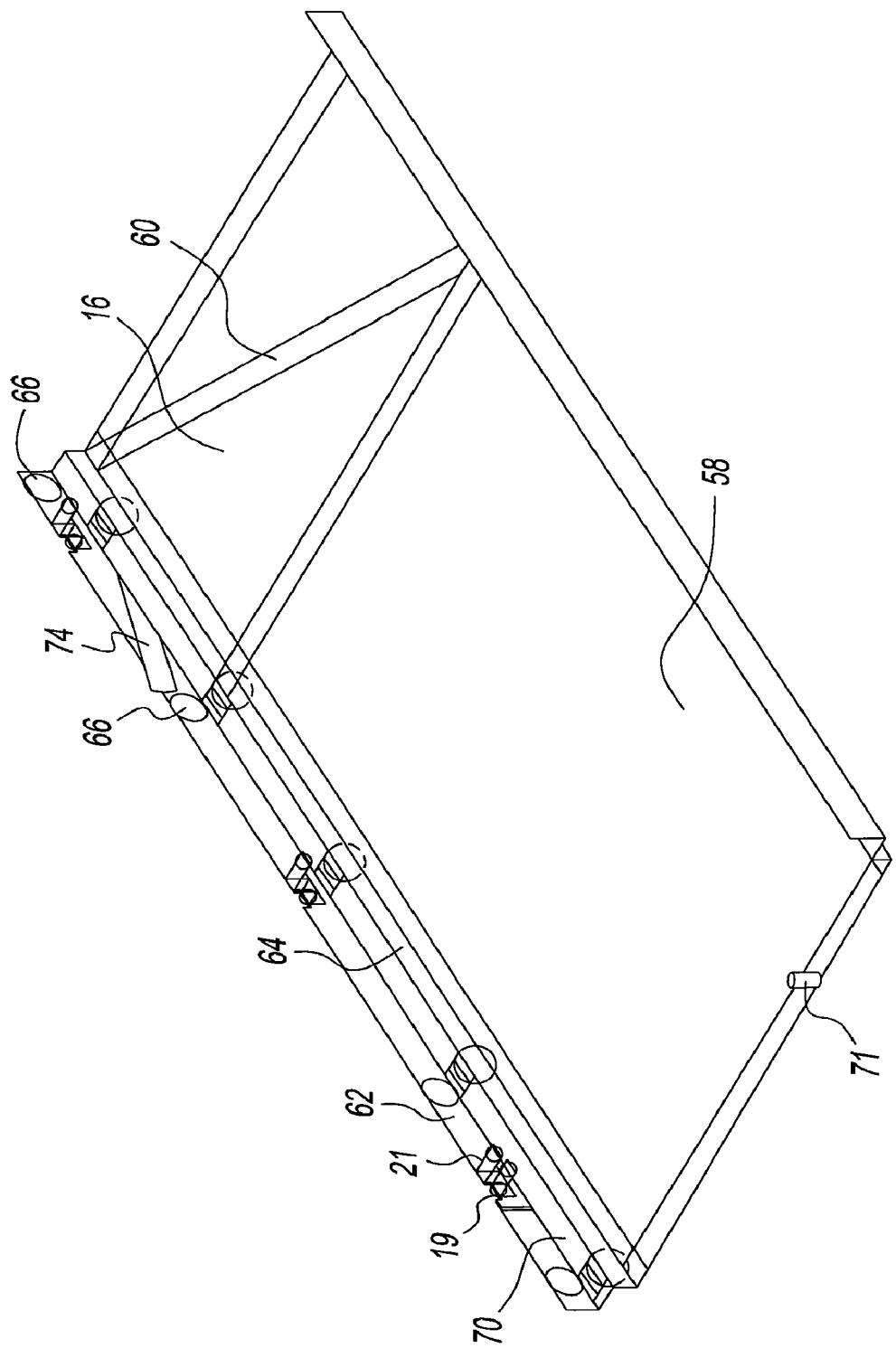
FIG. 6 illustrates a perspective view of the cradle of the of the flatbed extender system of FIG. 3.

FIG. 5 shows channel 14 of extender bed system 10 is shown. Channel 14 is fixedly connected to the vehicle bed of vehicle 12. Extender bed of FIG. 4 slides within in cradle 16, which is movable in channel 14. Channel 14 is preferably bolted to sidewalls or underside of vehicle 12 using bolts 52 for optimal strength, particularly when the vehicle 12 is a large vehicle. Channel 14 also has a slot 56 on its front end to catch a locking mechanism on cradle 16 that will be discussed further below. Channel 14 can be of any size to accommodate pick-up trucks and hatchback vehicles and larger moving vehicles. Alternatively, a connecting bracket 54 may be used to secure channel 14 to vehicle bed for a larger extender bed systems that would carry a relatively large load. For smaller loads, welding channels to the vehicle would provide proper support FIG. 6 shows cradle 16 of the present invention. Cradle 16 is sized to be received within channel 14 in a sliding relationship. Cradle 16 has a base structure 58 and a support structure 60 located towards the back of cradle 16.

Cradle 16 has a two pairs of lateral bearing support surfaces, namely upper support surface 62 and lower support surface 64, located on opposite sides of base structure 58 that support the bearings. Upper support surface 62 supports upper level bearings 66. Lower support surface 64 supports lower level bearings 68. Bearings 66 and 68 support entire weight of load. Bearing support surfaces 62 and 64 have a stepped configuration with a connecting surface or horizontal platform 70 that connects the surfaces 62 and 64. Support surfaces 62 and 64 support entire row of upper bearings 66 and lower bearings 68, respectively, along the length of cradle 16. The bearings 66 and 68 located along the entire length of cradle 16 permit the cradle to slide within channel 14 and extender bed 18 to slide along the cradle to fully extend from the vehicle 12. Additionally, there are two guides 19 and 21 that each has a bearing on the end thereof. Guide 19 maintains position of cradle 16 within channel 14. Guide 21 maintains position of extender bed 18 within cradle 18. Guides 19 and 21 are on opposite side of cradle 16 and extender bed 18, respectively.

Figure 7:
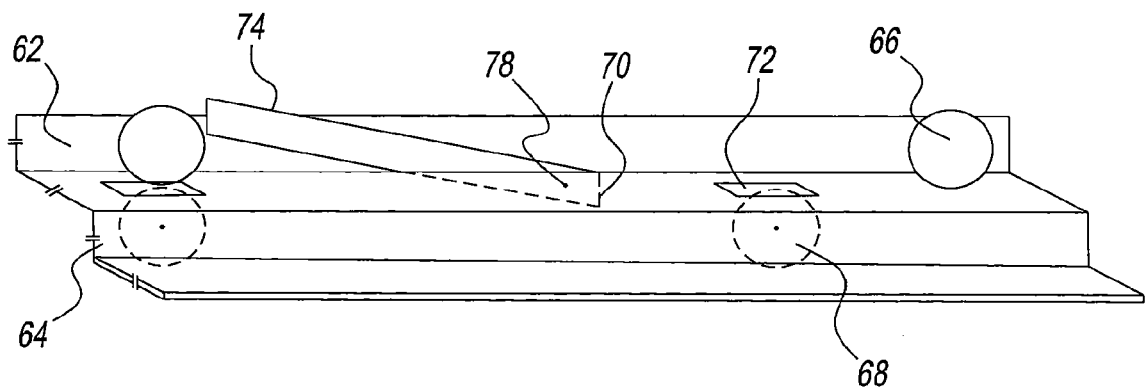
FIG. 7 illustrates an exploded sectional view of the lock mechanism of the cradle of the flatbed extender system of FIG. 1.
Figure 8:
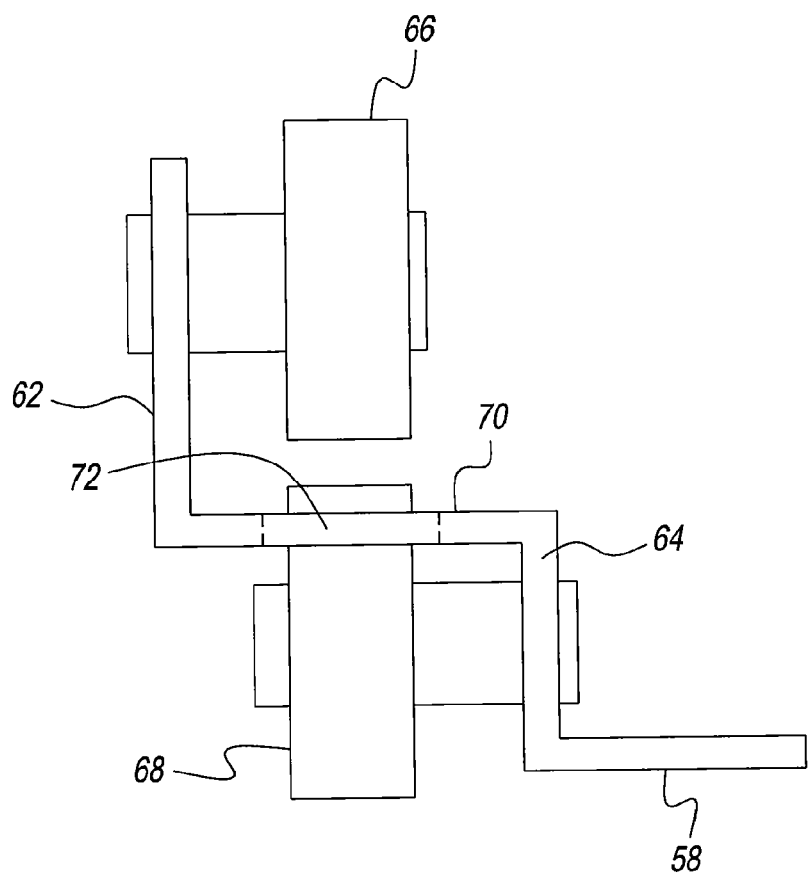
FIG. 8 illustrates an exploded side view of the bearing assembly of the cradle of the flatbed extender system of FIG. 1.

Referring to FIGS. 7 and 8, connecting surface 70 has a series of openings 72 to allow for the passage of lower level bearings 68 that are connected to lower support surface 64. Openings 72 ensure that the clearance between upper level bearings 66 and lower level bearings 68 will provide for clearance for extender bed 18 to slide through. Further, the small clearance will ensure that the extender bed 18 that passes through the clearances will be adequately supported. Upper support surface 62 and lower support surface 64 each preferably support the same number of bearings. Corresponding bearings of support surfaces 62 and 64 may also be in registration with each other. In longer extender bed systems, corresponding bearings are preferably in registration with one another to provide proper support for a long bed that moves between corresponding bearings. Further, by having a greater number of corresponding bearings, the shifting of extender bed 18 as it moves in cradle 16 is reduced. Flanges 85 extend along the entire length of extender bed 18 to allow full extension from vehicle 12.

Bearings 68 extend through opening 72 and extend lower than base 64 of cradle 16. Cradle 16 is able to slide on channel 14 because bearings 68 are of such a diameter to extend beneath base 58.

Figure 9:
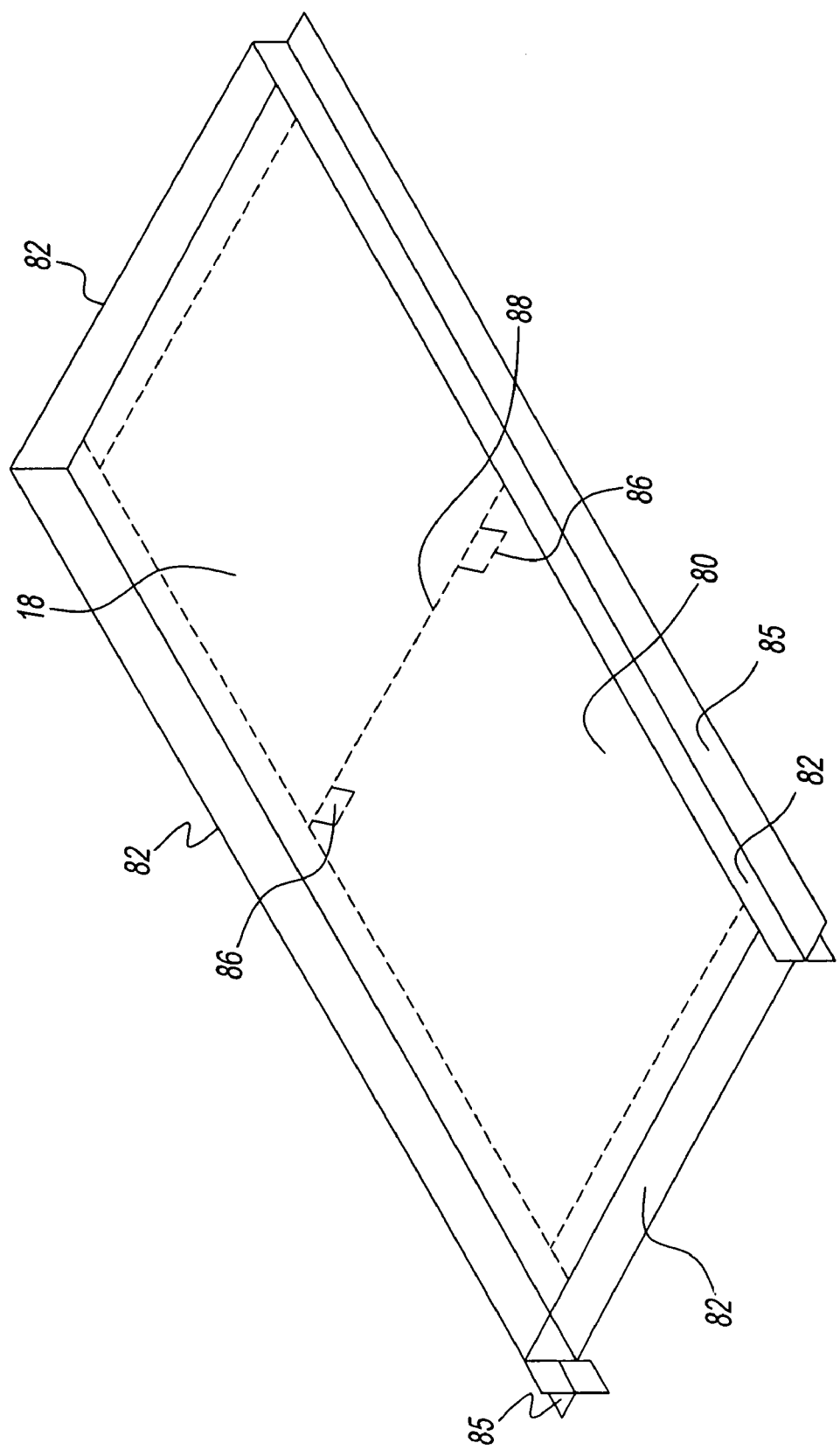
FIG. 9 illustrates a perspective plan view of the extended bed of FIG. 1 of the present invention.
Figure 10:
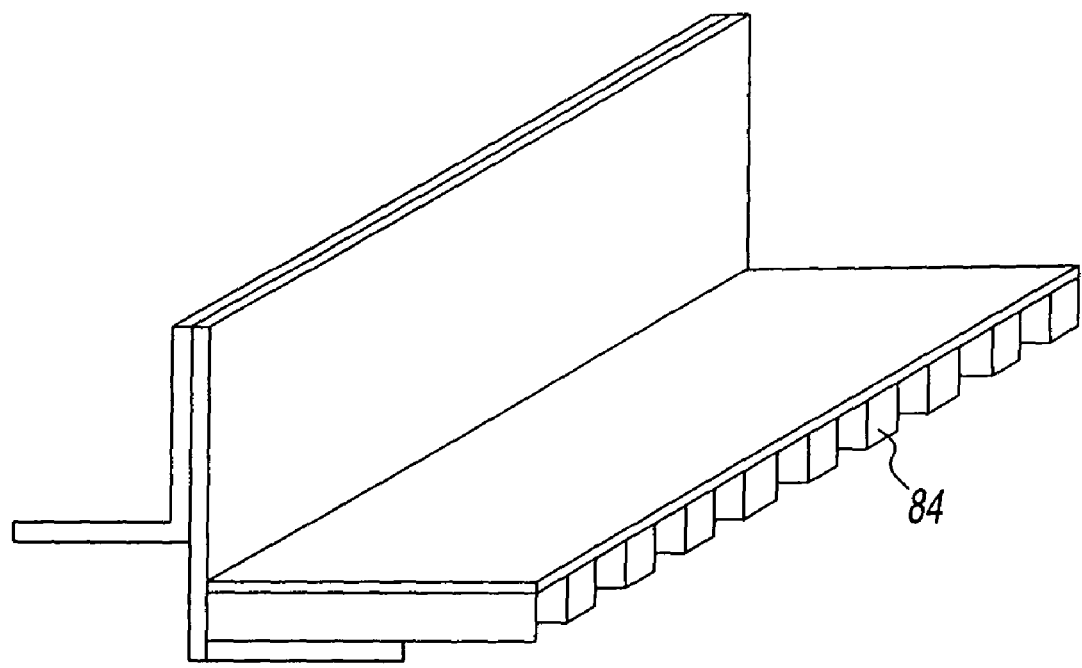
FIG. 10 illustrates a perspective view of extender bed of FIG. 1.
Figure 11:
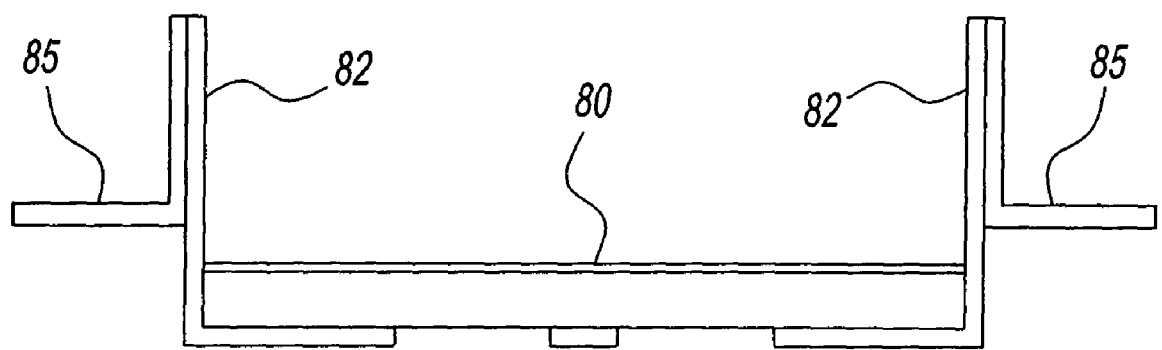
FIG. 11 illustrates a front view of the extender bed of FIG. 1.

As noted above, cradle 16 preferably has a locking mechanism 74. Locking mechanism 74 is a rod that is pivotally connected to cradle 16. Locking mechanism 74 has a locking end that is biased in an upward position to interact with a slot 56 in channel 14. If cradle 16 inadvertently slides in a direction away from the front of vehicle 12, cradle 16 is stopped when locking mechanism 74 slides into slot 56. Locking mechanism 74 either has an end beneath cradle 16 that is weighted or pivots about a point 78 that is not at its center to ensure that locking end 60 of locking arm remains in an upward biased position. Cradle 16 has an additional safety feature 71 that interacts with extender bed 18, discussed below Referring to FIGS. 9 through 11, extender bed 18 is shown. Extender bed 18 has a deck 80 that receives cargo. Deck 80 has sides 82 to prevent any cargo from shifting or falling during transport. Deck 80 can be reinforced from below as shown in FIGS. 10 and 11, to ensure that cargo will not penetrate the surface. When extender bed system 10 is used for heavy cargo, such as the contents of a home, reinforcement is required. Deck 80 can have, for example, a corrugated lower surface 84 to provide additional support. Alternatively, deck 80 can be made from stronger materials that are reinforced with steel. Additionally, sides 82 are connected to deck 80 to provide additional support from below. Sides 82 extend beneath deck 80 to support from below to relieve stress at lateral sides of deck. Extender bed 18 has flanges 85 that are on opposite sides of deck 80. Flanges 85 are very straight and are sized to slide smoothly between bearings 66 and 68 of cradle 16.

Extender bed 18 has two safety features to ensure that a user is not harmed during extension. Extender bed 18 is securely connected to cables 36 and 38 to prevent accidental detachment from system 10. Cables 36 and 38 can be reinforced with steel when heavy loads are placed in deck 80. Additionally, extender bed 18 has angles 86 placed on the underside of its midpoint 88. Angles 86 will catch rod 71 on front edge of cradle 16 should extender bed 18 attempt to slide from cradle 16.

Channel 14, cradle 16 and extender bed 18 are preferably constructed from any strong and lightweight material. The components could be made from for example, aluminum, although other light weight strong materials such as polymers or composite materials could be used.

While the present disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the present disclosure without departing from the scope thereof. Therefore, it is intended that the disclosure not be limited to the particular embodiment(s) disclosed as the best mode contemplated for carrying out this disclosure, but that the disclosure will include all embodiments falling within the scope of the appended claims.

I claim:

1. A flatbed extender system for a vehicle having a flatbed comprising:
   a channel being affixed to the flatbed;
   a cradle being slidingly received within said channel; said cradle comprising a pair of upper support surfaces disposed on opposite sides of said cradle that each supports a row of bearings and a pair of lower support surfaces disposed on opposite sides of said cradle that each supports a row of bearings, and a horizontal support surface that connects each of said upper support surface and lower support surface disposed on opposite sides of said cradle; said horizontal support surface comprising openings for passage of bearings of said row of bearings connected to said each of said pair of lower support surfaces; and
   an extendable bed having a pair of flanges disposed on opposite sides thereof, wherein one of said pair of flanges is disposed between rows of bearings on one side of said cradle and the other of said pair of flanges is disposed between rows of bearings disposed on an opposite side of said cradle for rolling movement of said bed within said cradle and said cradle within said channel.

2. The flatbed extender system according to claim 1, wherein said row of bearings disposed on an upper support surface and said row of bearings disposed on a lower support surface of a same side of said cradle lie in registration.

3. The flatbed extender system according to claim 1, wherein said rows of bearings permit said cradle to extend beyond the flatbed of the vehicle.

4. The flatbed extender system according to claim 1, further comprising a winch that secures said extendable bed to the vehicle.

5. The flatbed extender system according to claim 4, further comprising a motor operably connected to said winch to control said winch.

6. The flatbed extender system according to claim 5, further comprising a remote control to control said motor remotely.

7. The flatbed extender system according to claim 5, wherein said motor permits said extender bed to commence movement and to stop movement.

8. The flatbed extender system according to claim 1, further comprising a locking mechanism pivotally connected to said cradle.

9. The flatbed extender system according to claim 8, wherein said locking mechanism comprises a rod that pivots about a point not at a center of said rod.

10. A flatbed extender system for a vehicle having a flatbed comprising:
    a channel that is affixed to the flatbed;
    a cradle having a first longitudinal side and a second longitudinal side opposite said first longitudinal side, said first longitudinal side and said second longitudinal side each comprising an upper support surface and a lower support surface and a horizontal support surface that connects said upper support surface and said lower support surface, wherein said horizontal support surface comprises openings;
    a rows of bearings connected to said upper support surface and a row of bearing connected to said lower support surface of said first longitudinal side and said second longitudinal side of said cradle, wherein said row of bearing connected to said lower support surface pass through said openings; and
    an extender bed capable of sliding between rows of bearings connected to said first longitudinal side and said second longitudinal side for a predetermined distance.

11. The flatbed extender system according to claim 10, wherein said rows of bearings permit said cradle to extend beyond the flatbed of the vehicle.

12. The flatbed extender system according to claim 10, further comprising at least one support leg, said at least one support leg being extendable from said extendable bed to support said bed in an extended position.

13. The flatbed extender system according to claim 12, further comprising a crank that adjusts a length of said at least one leg.

14. The flatbed extender system according to claim 13, wherein said at least one foldable support leg is two support legs.

15. The flatbed extender bed system according to claim 13, wherein said two support legs each has a wheel attached thereto.

16. The flatbed extender system according to claim 10, further comprising a winch that enables movement of said extendable bed by at least one cable.

17. The flatbed extender system according to claim 16, further comprising a motor operably connected to said winch.

18. The flatbed extender system according to claim 17, further comprising a remote control wherein said remote control controls said motor remotely.

19. The flatbed extender system according to claim 10, further comprising a locking mechanism pivotally connected to said cradle.

20. The flatbed extender system according to claim 19, wherein said locking mechanism comprises a rod that pivots about a point not at a center of said rod.

21. The flatbed extender system according to claim 6 or claim 18, wherein a switch manually controls said motor.

* * * * *